(12) United States Patent
Cormack et al.

(10) Patent No.: US 7,070,501 B2
(45) Date of Patent: Jul. 4, 2006

(54) GAMING MACHINE WITH FREE GAME PLAY

(75) Inventors: William George Cormack, Lane Cove (AU); Leonard Bruce Woods, Lane Cove (AU); Russel James Gartner, Lane Cove (AU); Craig William Allardice, Lane Cove (AU)

(73) Assignee: Aristocrat Technologies Australia Pty Ltd., New South Wales (AU)

( * ) Notice: Subject to any disclaimer, the term of this patent is extended or adjusted under 35 U.S.C. 154(b) by 662 days.

(21) Appl. No.: 10/205,166

(22) Filed: Jul. 25, 2002

(65) Prior Publication Data

US 2003/0069056 A1 Apr. 10, 2003

(30) Foreign Application Priority Data

Jul. 25, 2001 (AU) .................................. PR 6586

(51) Int. Cl.
*A63F 9/24* (2006.01)
*A63F 13/00* (2006.01)

(52) U.S. Cl. ........................... 463/16; 463/12; 463/20; 463/25; 705/14

(58) Field of Classification Search ..................... None
See application file for complete search history.

(56) References Cited

U.S. PATENT DOCUMENTS

| 5,342,047 A | * | 8/1994 | Heidel et al. ................. 463/29 |
| 5,647,798 A | * | 7/1997 | Falciglia ....................... 463/19 |
| 5,935,002 A | * | 8/1999 | Falciglia ....................... 463/19 |
| 5,951,397 A | * | 9/1999 | Dickinson .................... 463/36 |
| 5,971,849 A | * | 10/1999 | Falciglia ....................... 463/16 |

* cited by examiner

*Primary Examiner*—Mark Sager
(74) *Attorney, Agent, or Firm*—Greenberg Traurig, LLP (57) ABSTRACT

A gaming machine 10 has a display 12 and a game controller arranged to control images of symbols displayed on the display 12. The game controller is arranged to play a game wherein at least one random event is caused to be displayed on the display 12 and, if a predefined winning event occurs, the machine 10 awards a prize. The game controller monitors and stores data relating to a number of free games awarded to a player during a playing session. The gaming machine 10 includes a selector for operation by the player so that the player can choose when, during the playing session, any free game is to be played.

21 Claims, 11 Drawing Sheets

GAMING MACHINE WITH FREE GAME PLAY

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to the invention, there is provided a gaming machine having a display means and a game control means arranged to control images of symbols displayed on the display means, the game control means being arranged to play a game wherein at least one random event is caused to be displayed on the display means and, if a predefined winning event occurs, the machine awards a prize, the gaming machine being characterized in that the game control means monitors and stores data relating to a number of free games awarded to a player during a playing session and in that the gaming machine includes a selecting means for operation by the player so that the player can choose when, during the playing session, any free game is to be played.

It will be appreciated that the provision of the selecting means enables a player to select when, during any playing session, that player wishes to play the free games and the player is not compelled to await the end of such a playing session before the free games are played.

The gaming machine may display, on the display means, the number of free games awarded to the player for enabling the player to know how many free games that player has available to him or her.

In one embodiment of the invention, the free games may be awarded to the player on the occurrence of an appropriate trigger condition in one of an underlying base game and a feature game. In another embodiment of the invention, each time one or more special symbols appears on the display means, each such special symbol may cause a counter to increment and, when the counter has reached its maximum value, a free game is awarded.

The selecting means may be in the form of a switch arrangement. The switch arrangement may be arranged on a midtrim of the gaming machine to be accessed by a player. In addition, or instead, the selecting means may comprise a touch-sensitive zone on a screen display of the display means.

The selecting means may also includes a free game menu selector. The free game menu selector may be implemented by way of a press-button switch on the midtrim and/or a touch sensitive zone of a screen display of the display means.

The game control means may be responsive to activation of the free game menu to cause a menu of free games awarded to be displayed and the conditions which applied at the time such free games were awarded so that the player is aware what conditions are applicable to those free games when they are played.

The game control means may display the menu for a predetermined period of time following which it is removed and an underlying screen is again displayed. Instead, the menu may be displayed in an at least partially transparent mode so that underlying material on the display means is visible through the menu.

Still further, the game control means may issue a warning when the menu is full. The warning may include an indication that the free games are about to be played off and then playing of the free games may commence.

Also, when the menu is full, if any further free games are awarded, the game control means may cause the further free games to be played automatically immediately after the game which triggered the awarding of the free games and prior to further game play. An appropriate message may be conveyed to the player to indicate that the menu is full.

The gaming machine may include an alerting means for alerting the player that there are unplayed free games so that the player does not leave the machine without having played the free games. The alerting means may be in the form of a discernible alarm signal. The discernible alarm signal may be in the form of a visual message and/or an audible signal.

Still further, the game control means may be configured automatically to play the free games once credit of the player has been depleted.

The player may be able to select to play all unplayed free games by appropriate manipulation of controls of the gaming machine. Thus, the player may select to play all unplayed free games in one go. This the player may do by pressing a "Collect" button on the midtrim of the gaming machine. When the player wishes to pay out outstanding winnings, if any, after completion of all the free games, the player may need to press the "Collect" button again. It will be appreciated that, instead of manipulating the "Collect" button, the player may select to play all the unplayed free games by touching a touch-sensitive region of the display means overlying an appropriate icon of the display means.

For auditing purposes, any free game played which results in a win may be associated with a last paid game played rather than with a paid game that triggered the free game. Hence, although the paid game prior to the free game play may not have been the game that triggered the free game, the free game may be treated as an extension of that prior paid game for the gaming machine's metering of money won, turnover, games played, etc.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
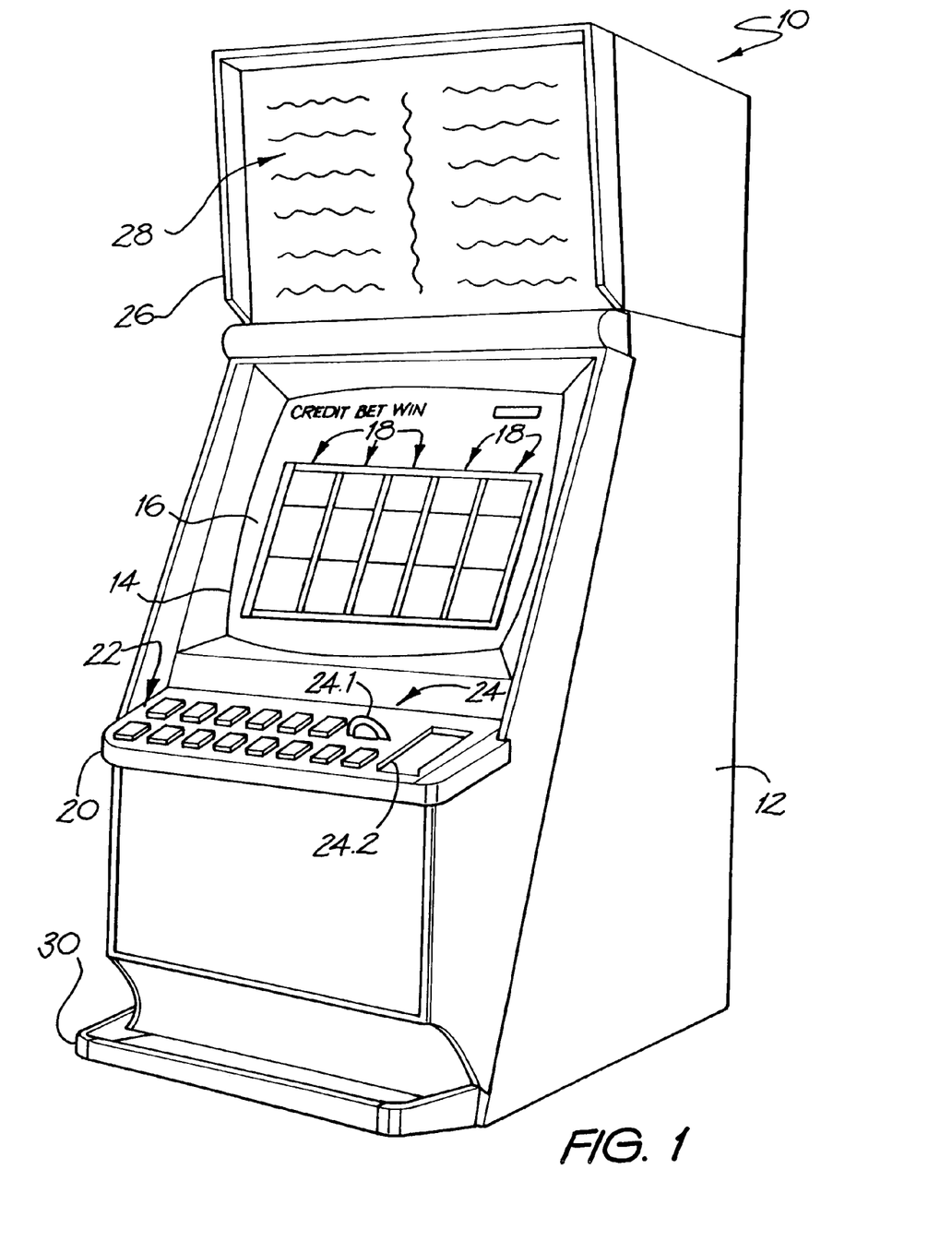
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
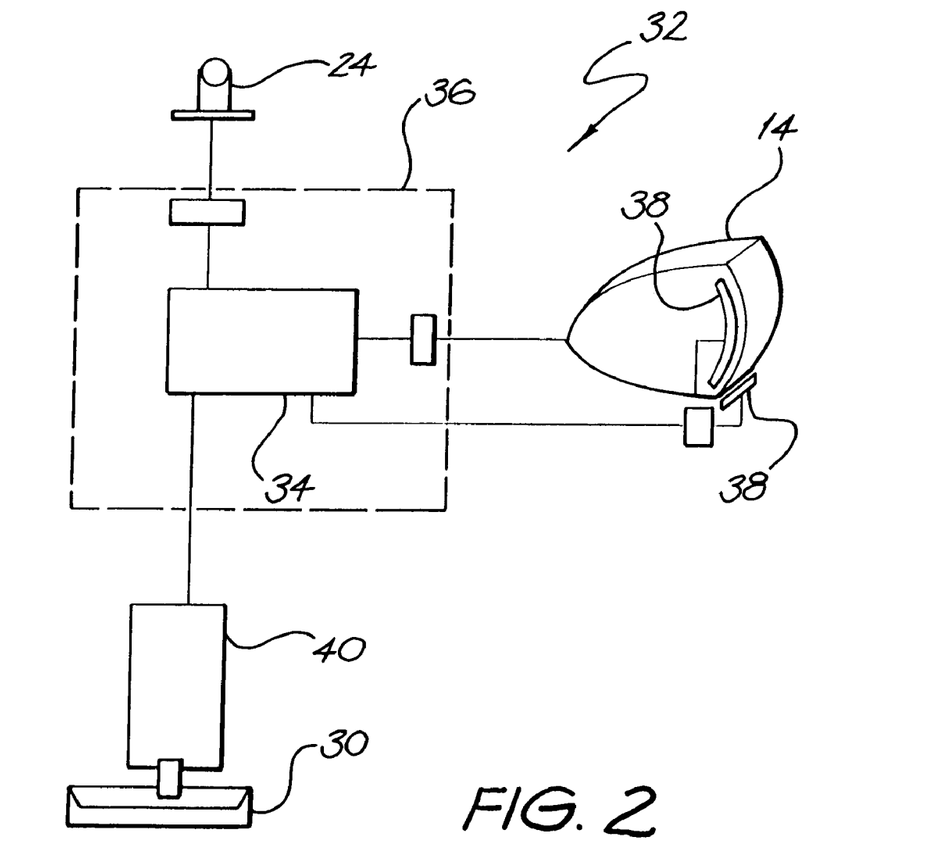
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives a screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 4:
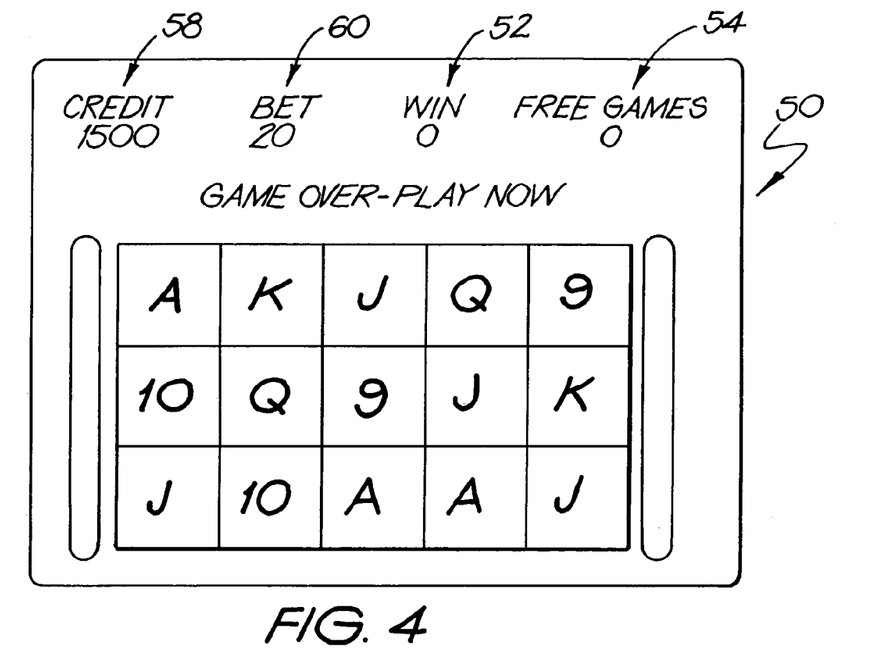
FIG. 4 shows a screen display of a first game in accordance with a first embodiment of the invention.

In FIG. 4, a screen display of a base game 16, in accordance with a first embodiment of the invention is illustrated and is designated generally by the reference numeral 50. As indicated above, the game 16 is of a spinning reel game having a video simulation of five spinning reels 18.

In the example of the game 16 played according to the first embodiment of the invention and illustrated in FIG. 4 of the drawings, it is assumed that the player is playing one credit per line and 20 paylines on the machine. The result of a first game in a playing session is as shown in FIG. 4 where no win occurred and no free games were awarded.

Figure 5A:
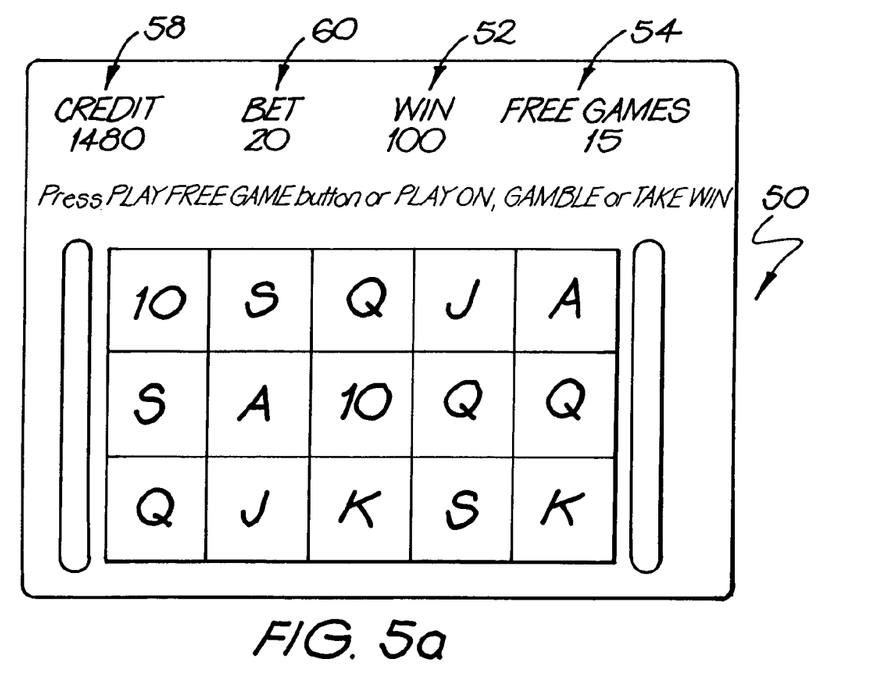
FIGS. 5*a* to 5*g* show screen displays of a sequence of games played following the game illustrated in FIG. 4.

A following game is shown in FIG. 5*a* of the drawings. For the combination of three scatter symbols S, the player wins 100 credits as indicated by a win meter 52. In addition, the three scatter symbols S constitute a trigger condition for the awarding of 15 free games. The free games won are shown on a meter 54 of the screen display 50. It is to be noted that the number of scatter symbols S spun up govern the number of free games which are awarded. Thus, for three scatter symbols S, 15 free games are awarded, for four scatter symbols S, 20 free games are awarded and for 5 scatter symbols S, 25 free games are awarded.

Figure 3:
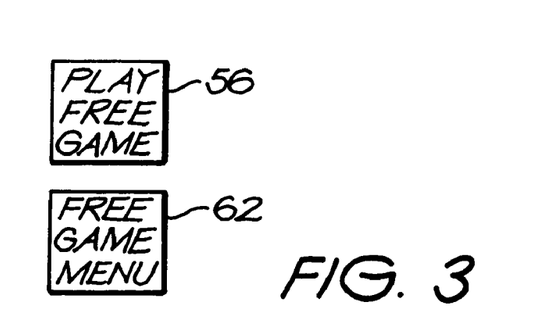
FIG. 3 shows a part of a midtrim of the gaming machine indicating additional buttons added to the midtrim.
Figure 5B:
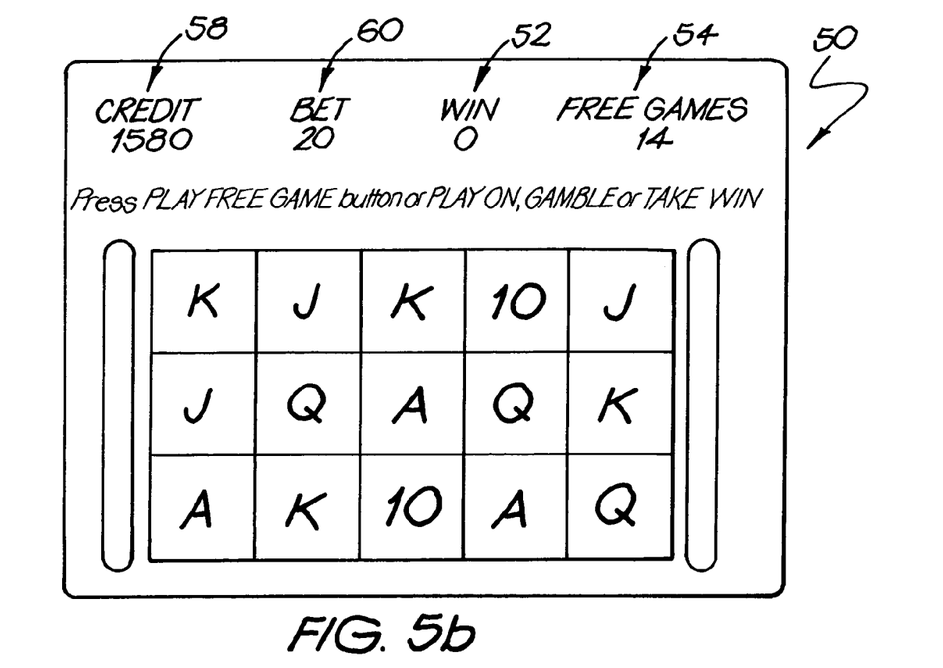

The player has the option of deciding when that player wishes to play any of the free games awarded. Thus, the player need not await the end of the playing session before access to the free games can be gained. By pressing a button 56 (FIG. 3) marked "PLAY FREE GAME" on the midtrim 20 of the machine 10, the player can play one or more of the free games which have been awarded. It is assumed that, for the next game, the player decides to use one of the free games and the player presses the button 56. As a result, as shown in FIG. 5*b* of the drawings, the meter 54 is decremented by one. The result of the game is shown in FIG. 5*b* where no win was achieved and, accordingly, the win meter 52 illustrates a zero entry. Due to the fact that it was a free game which was played, a credit meter 58 is not decremented. Further, because it is a free game the bet made, as illustrated by a bet meter 60, is unchanged being the same as it was for the underlying game in which the free games were awarded. It is to be noted that, after any free game has been played, the default reading on the bet meter 60 will be from the underlying game which gave rise to that free game.

Figure 5C:
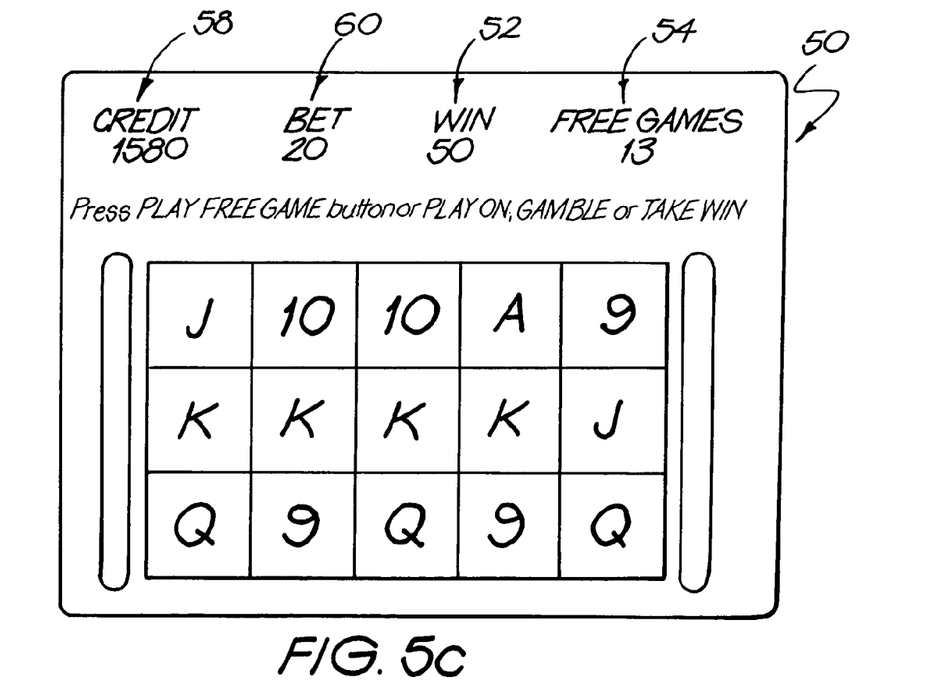
Figure 5D:
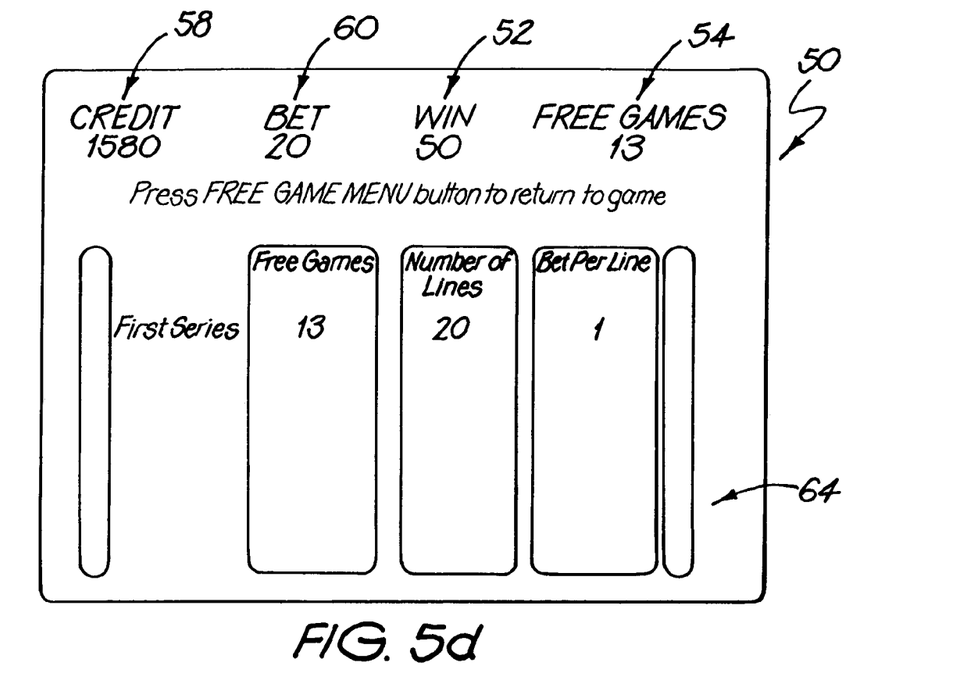
Figure 5E:
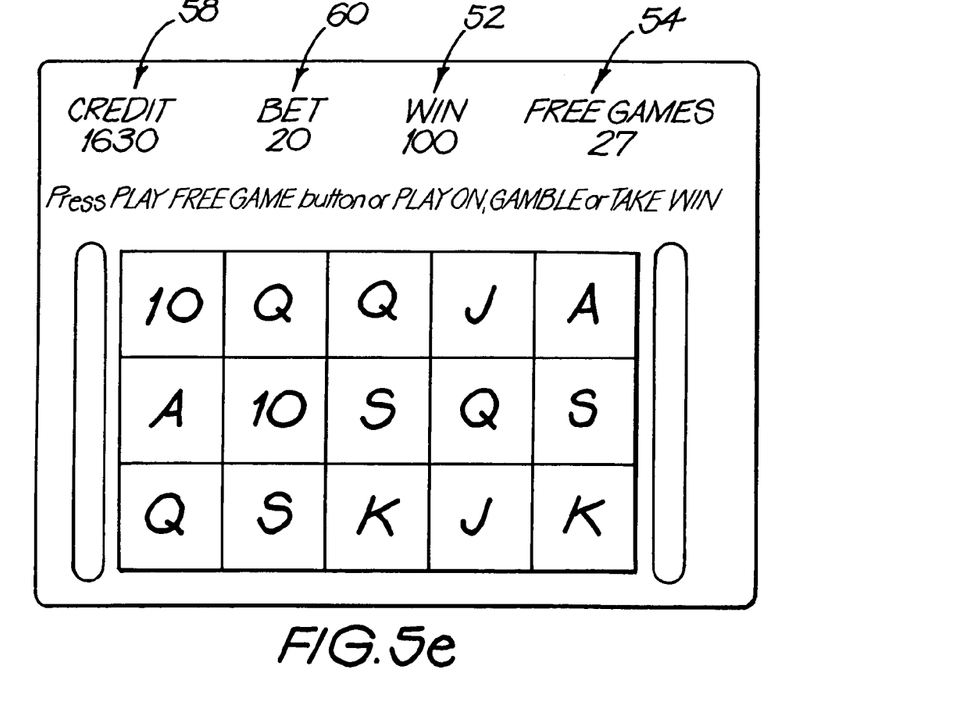

The player then again presses the button 56 on the midtrim 20 so that the number of free games displayed on the meter 54 is decremented by one as shown in FIG. 5*c* of the drawings. The result of the free game is that the player wins 50 credits for the combination of 4×K on the first payline, the win being shown on the win meter 52. For a following game (as shown in FIG. 5*e* of the drawings) the amount shown on the win meter 52 is transferred to the credit meter 58 which is incremented by 50 credits.

The player can determine what conditions apply to the free games. More particularly, if the player wishes to determine how many lines were bet and how many credits were bet per line prior to a series of free game being awarded, the player can press a button 62 marked "FREE GAME MENU" on the midtrim 20 of the machine 10. By manipulating the button 62, a free game menu is displayed as shown at 64 in FIG. 5*d* of the drawings. The menu 64 is either displayed for a predetermined period of time or, by the player again pressing the button 62, the menu 64 is erased from the screen 50. In general, the menu 64 displays the following information:

Log #—the free game series number;
Free Games—the number of free games remaining in the series;
Bets Per Line—the bet per line for the game that triggered the free game series;
Lines—the number of lines played when the free game series was triggered; and
Multiplier—the multiplier applicable to the free game series.

Additional information which may be displayed in the menu 64 includes:
the size of a trigger prize so that, during free games, the appearance of a certain symbol will award a repeat of the trigger prize; and
a bonus symbol so that, during the free games a special prize or event occurs whenever that bonus symbol appears.

If desired, the menu 64 can be displayed in a transparent state so that underlying material on the screen display 50 is visible through the menu 64.

It is assumed that the player then pushes button 56 again to use a further free game. A result of the further free game is that a combination of three scatter symbols S is spun up resulting in a further series of fifteen free games being awarded. The meter 54 is incremented by 15 so that the player now has 27 remaining free games as shown in FIG. 5e of the drawings. Also, as a result of the three scatter symbols S, the player wins 100 credits.

It is to be noted that, for auditing purposes, any free game which results in a win is associated with the previous paid game rather than the paid game which triggered the series of free games from which the winning free game was played. Hence, although the paid game prior to the free game play may not have been the game that triggered the free game, the free game will be treated as an extension to that prior paid game for the purposes of metering of money won, turnover, games played etc. by the controller 36.

Figure 5F:
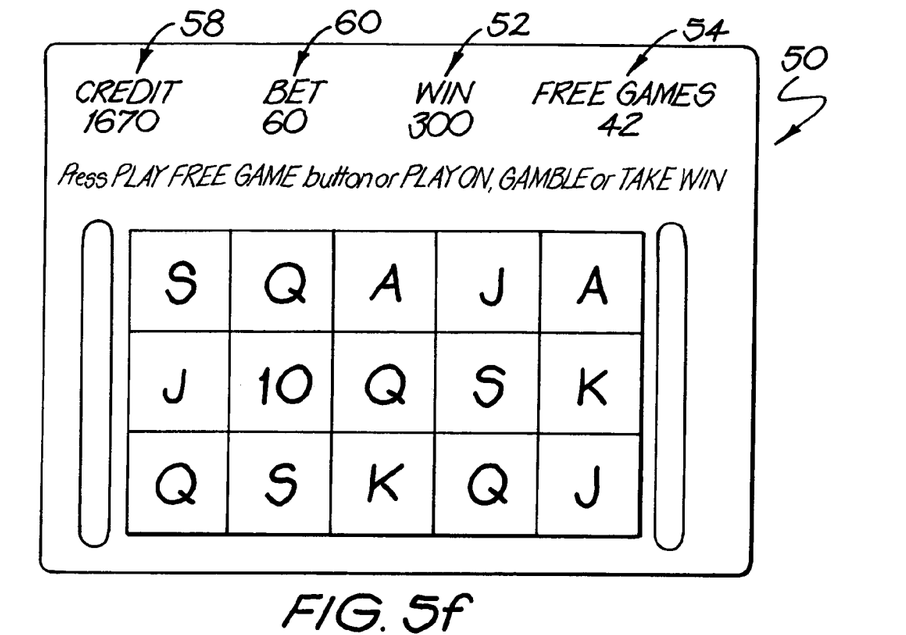

Reverting to the example, the credit meter 58 would have been incremented by 100 credits so that it read "1730". However, it is now assumed that the player changes the betting strategy and bets 3 credits per line on 20 lines of the gaming machine and plays a paying game, the result of which is shown in FIG. 5f of the drawings. Thus, the credit meter 58 is decremented by 60 credits so that it reads "1670". As a result of the three scatter symbols S being spun up and because the player is betting 3 credits per line, a win of 300 credits is awarded to the player as shown on the win meter 52. In addition, a further series of fifteen free games is also won resulting in the free game meter 54 being incremented by 15 to 42 free games.

Figure 5G:
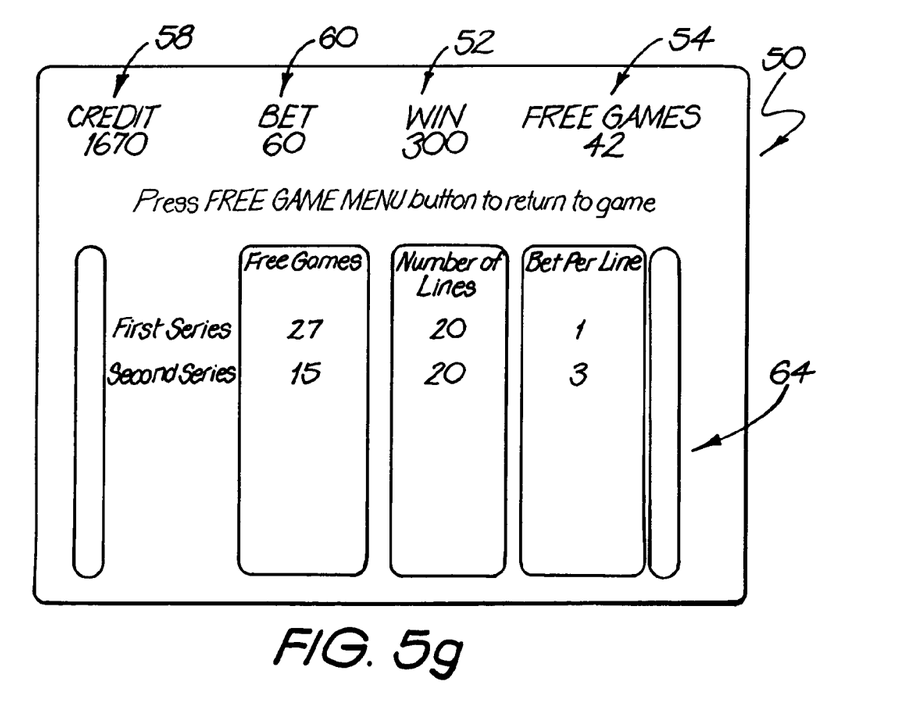

The player can at any time again check the status of the free games by operating the button 62 on the midtrim of the machine 10. The status of the free games after the sequence of games described above is shown in FIG. 5g of the drawings.

It is to be noted that, when the player selects to play a free game, it is always played from the first series of free games in the menu 64. If, during a free game, a combination is spun up that results in the awarding of a further series of free games, the new series of free games will, by definition, always be added to the number of entries of the log entry of the menu 64 being played rather than creating a new log entry. However, if a series of free games is awarded as a result of an intervening paid game, then, regardless of whether or not there was any change in betting strategy in that paid game in comparison with previous paid games, a new log entry is created in the menu 64 for the new series of free games.

Another way for the player to play all the free games in the menu 64 is for the player to press the "Collect" button (not shown) on the midtrim 22 of the gaming machine 10. When the "Collect" button is pressed and there are free games available to be played, then all the free games are played sequentially commencing with the oldest log entry in the menu 64 and continuing through all the log entries. This acts as a safety mechanism to reduce the likelihood of the player leaving the gaming machine 10 while there are still free games available to be played. If the player wishes to collect his or her winnings after completion of all the free games, the "Collect" button needs to be pressed again.

Figure 6:
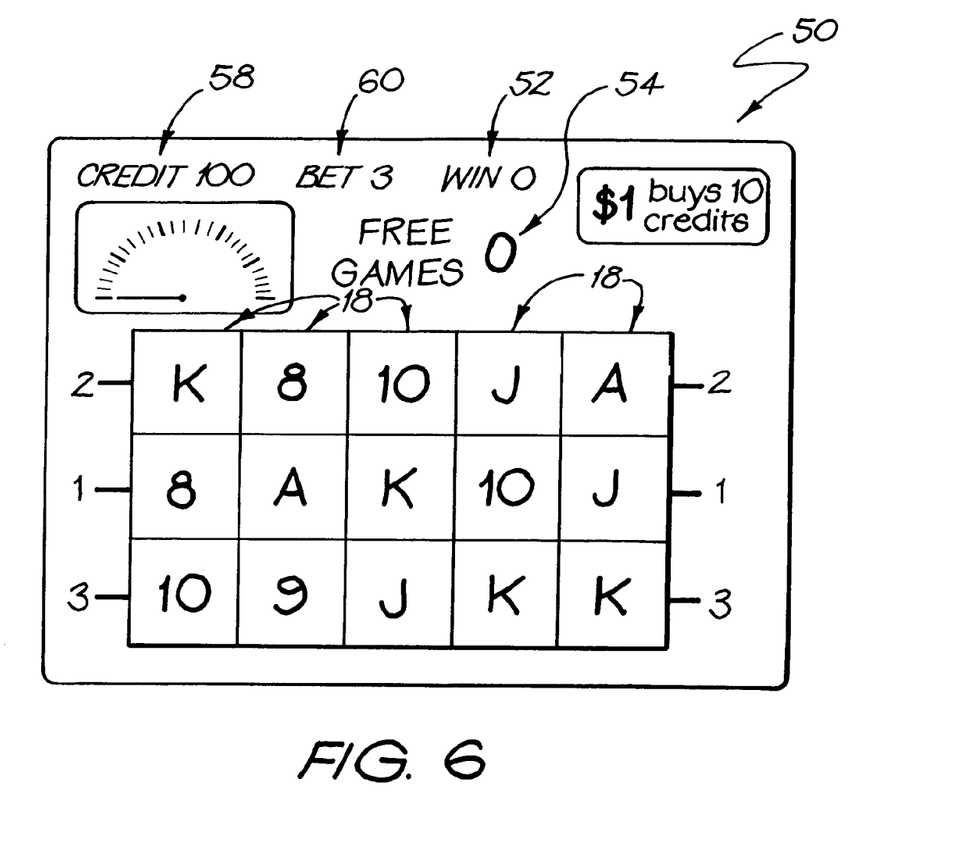
FIG. 6 shows a screen display of a first game in accordance with a second embodiment of the invention.

Referring now to FIGS. 6 and 7 of the drawings, a further embodiment of the invention is described. With reference to FIGS. 4 and 5 of the drawings, like reference numerals refer to like parts, unless otherwise specified. In this embodiment, it is assumed that the machine has 3 paylines and that wins are paid for left to right combinations.

Standard symbols on reels 18 of the gaming machine 10 will have background or transparent overlay symbols on them. These symbols 66 are shown as shaded symbols in FIGS. 7a to 7d of the drawings.

Figure 7A:
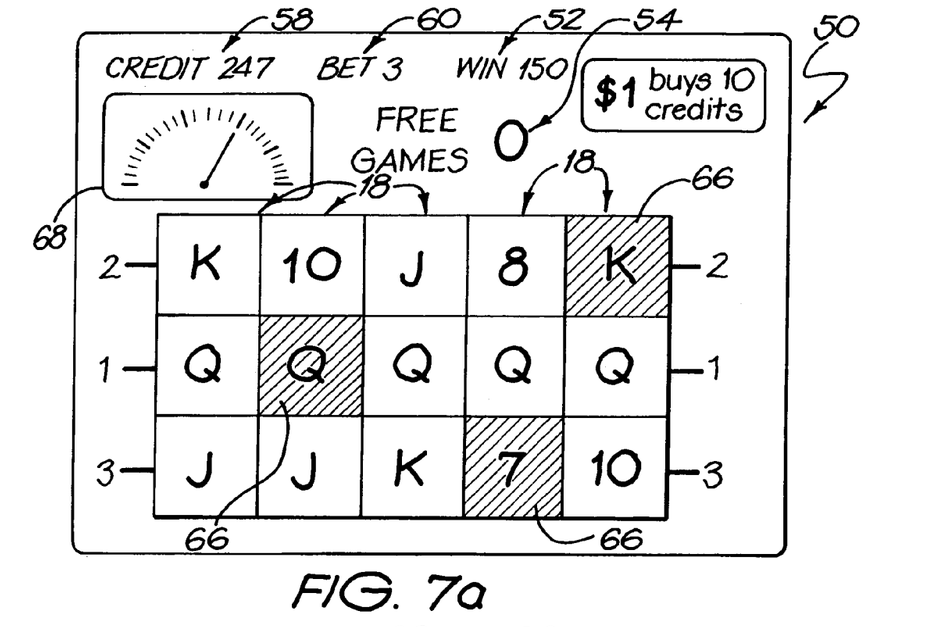
FIGS. 7*a* to 7*d* show screen displays of a sequence of games following the game illustrated in FIG. 6.

Each time a special symbol 66 is spun up, a counter 68 is incremented. Thus, as shown in FIG. 7a of the drawings, three special symbols 66 are spun up on the reels 18. As a result, the counter 68 is incremented by 3.

For the prize of 5×Q on payline 1, a win of 150 credits is added to the credit meter 58. However, it must be borne in mind that three credits had been wagered on the game, the result of which is shown in FIG. 7a of the drawings so that the sum of credits shown on the credit meter 58 is "247".

Because the counter 66 has not reached its maximum value, no free games are awarded and the free games meter 54 remains unchanged on zero.

Figure 7B:
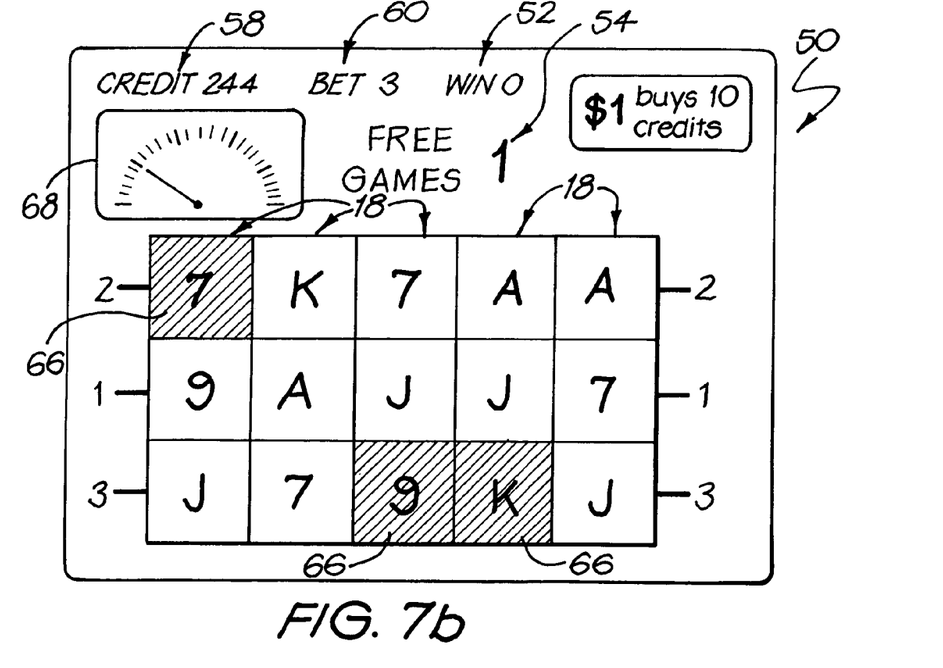

In the game shown in FIG. 7b of the drawings, the player has bet a further three credits decrementing the credit meter 58 by 3 to "244". No winning combinations are spun up on the reels 18. However, due to the fact that three further special symbols 66 were spun up on the reels 18, the counter 68 reaches its maximum displacement or value and one free game is awarded as shown on the meter 54. The counter 68 resets to zero but is then incremented by one.

Figure 7C:
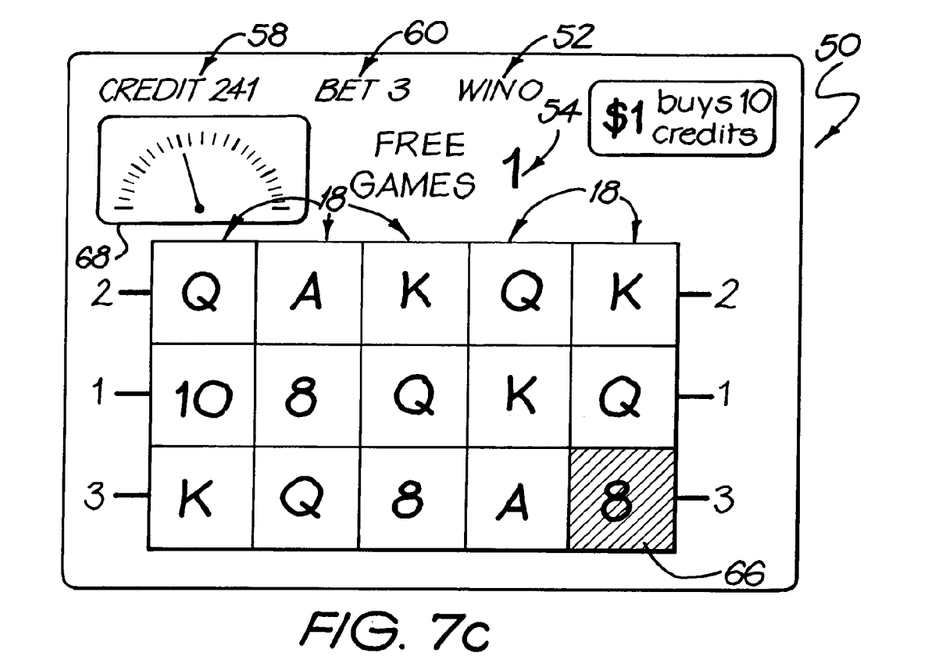

In the screen display 50 shown in FIG. 7c of the drawings, it is assumed that the player has again bet credits from the credit meter 58 rather than using the free game. The result is as shown in FIG. 7c of the drawings where no winning combinations of symbols were spun up on the reels 18. However, one additional special symbol 66 is spun up causing the counter 68 to increment by one.

Figure 7D:
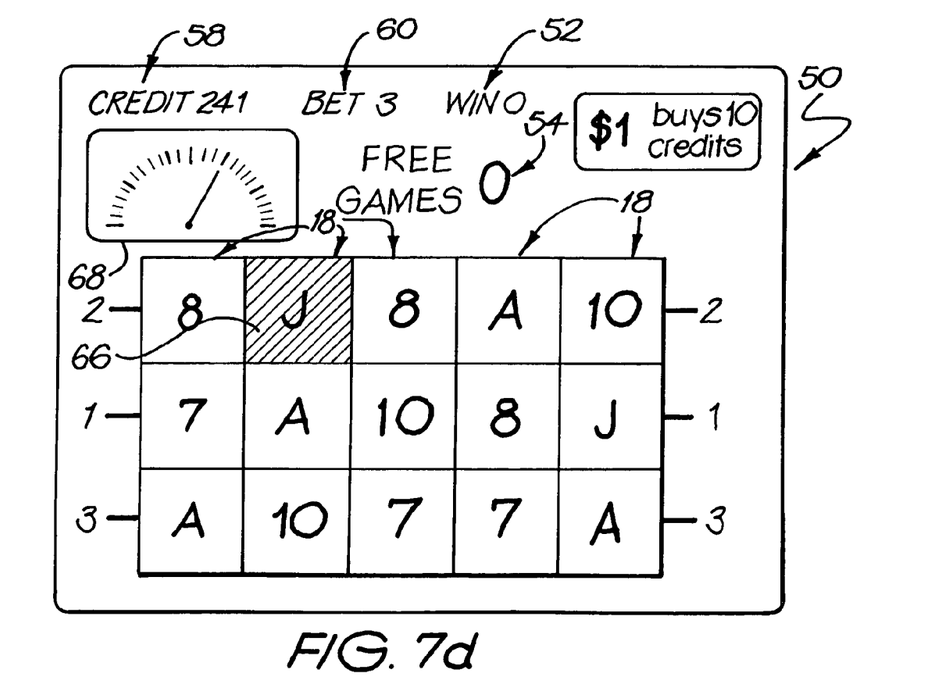
Figure 8:
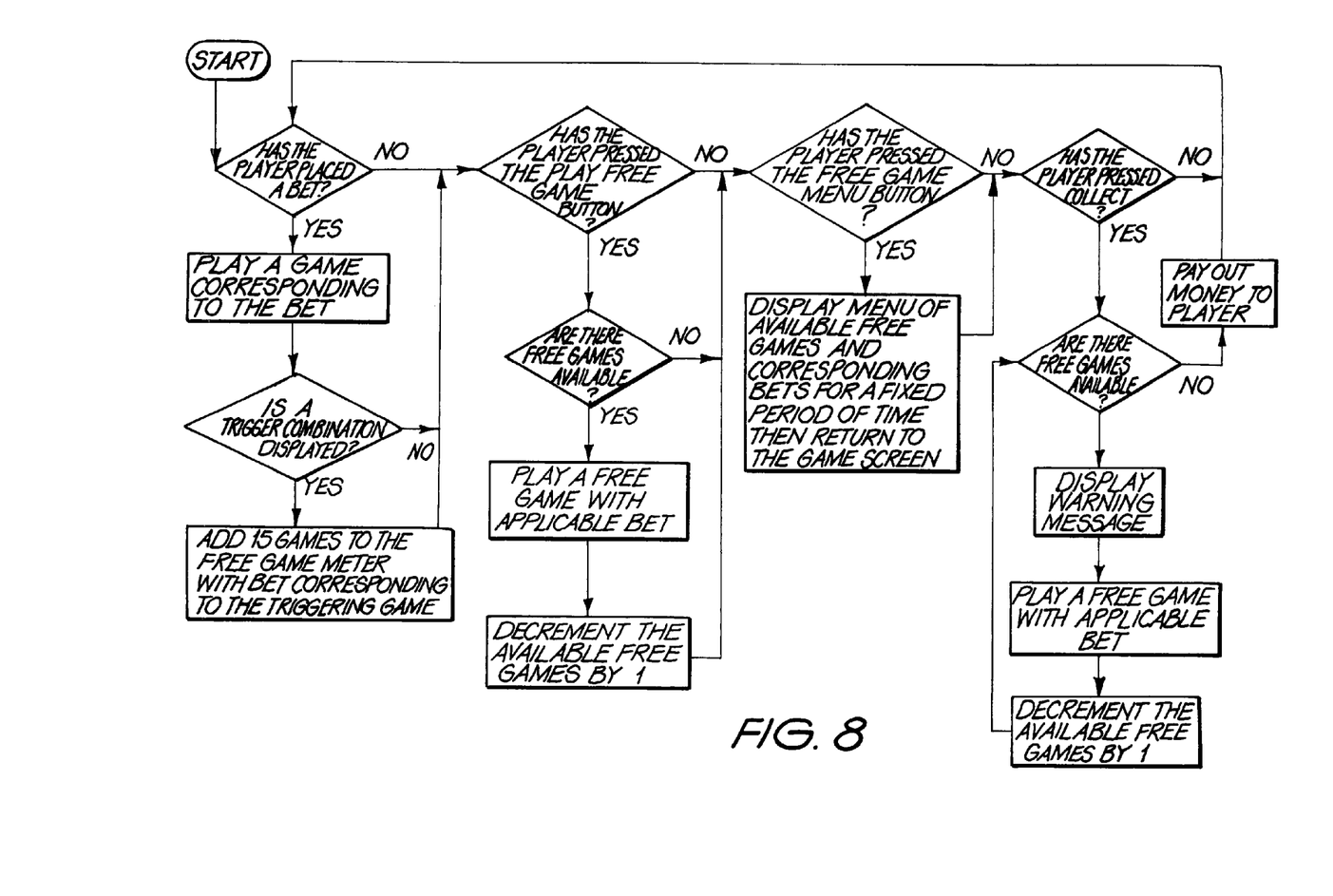
FIG. 8 shows a flow chart of the game according the first embodiment of the invention.
Figure 9:
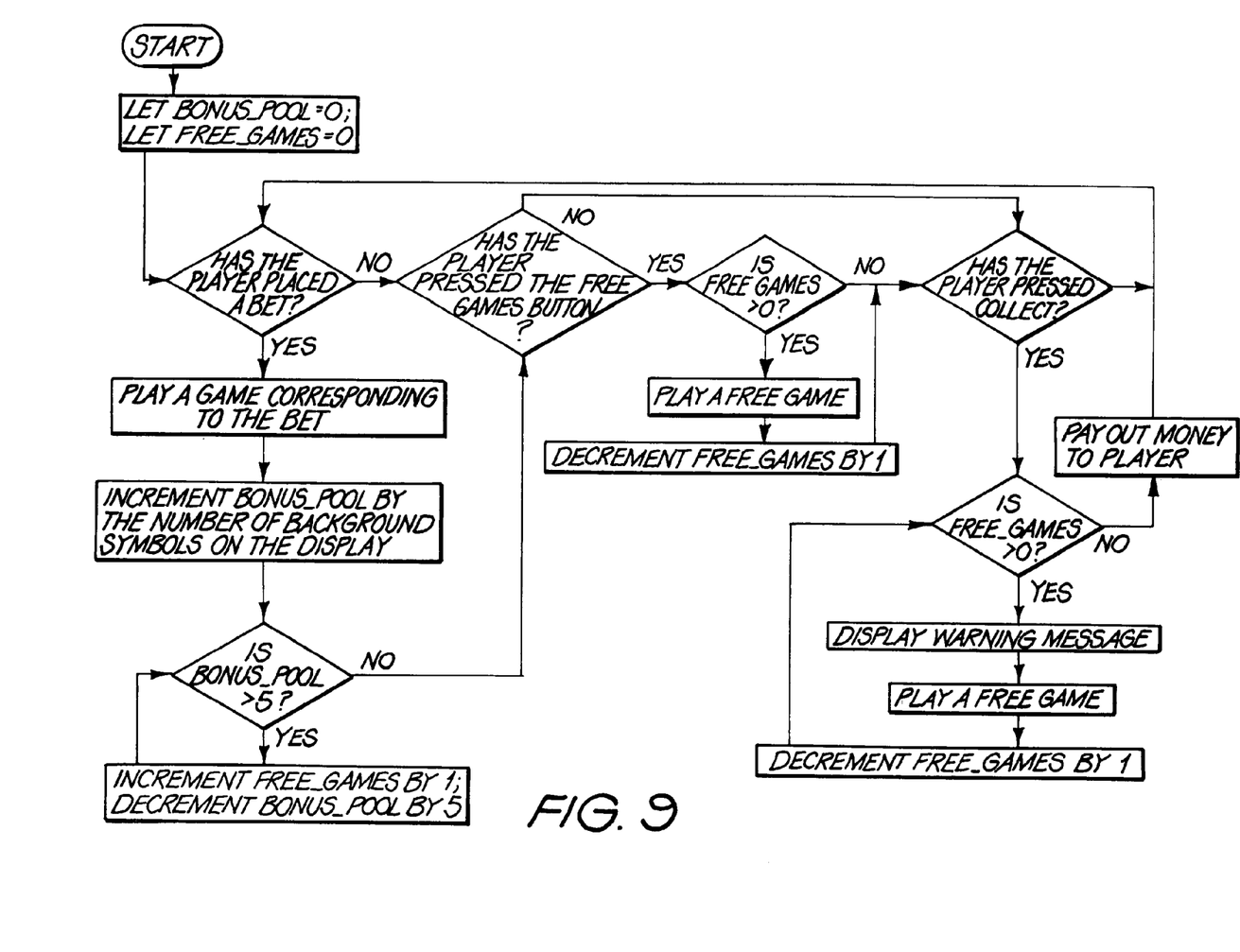
FIG. 9 shows a flow chart of the game according to the second embodiment of the invention.

In the embodiment shown in FIG. 7d of the drawings, the player presses the button 56 and uses the free game on the free game meter 54. Accordingly, the credit meter 58 remains unchanged. The result is as shown in FIG. 7d of the drawings. No winning combination is spun up on the reels 18 so no win results. One additional special symbol 66 is spun up so the counter 68 increments by one.

It is a particular advantage of the invention that a system is provided which enables the player to play free games when the player desires to do so, assuming that the player has free games available to play. Thus, the player is not at the mercy of the gaming machine in deciding as to when free games are to be played. Those skilled in the art will appreciate that, normally, free games have to be played immediately after they have been awarded. By allowing the player to play free games when the player desires to do so, the player has more options available to him or her. For example, the gaming machine 10 may be linked to a progressive jackpot with other gaming machines. The player may prefer not to be tied in to playing free games during the times when the player feels that the progressive prize is in play. Also, if the progressive prize is awarded to another player then, while the progressive prize is being paid out, the player may utilise his or her free games rather than playing credits which would contribute to access to the progressive prize.

Still further, if the player is of the opinion that the machine 10 is going through a "lean period" where prizes are not being awarded, the player can use any free game standing to his or her credit rather than relying on spending of credits credited to the credit meter 58. It must be emphasised that the appearance of a gaming machine having "lean periods" is an illusion created in the minds of players as gaming machines are not programmed to have "lean periods"!

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A gaming machine having a display and a game controller arranged to control images displayed on the display, the game controller being arranged to allow a player to play for a wager, during a game session, a game in which at least one random event is caused to be displayed on the display and, if a predefined free game winning event occurs, the machine awards at least one free game, the gamine machine being adapted to accept different wager configurations for each play of the game, the gamine machine being characterized in that:

the game controller stores data relating to a number of awarded free games and at least one free game characteristic of each free game awarded, the at least one free game characteristic relating to the wager configuration of a trigger game, the trigger game being the game in which the free game was awarded; and the gamine machine includes a free game selector operable by the player for choosing when, during playing session, any awarded free game is to be played, the free game, when played, being played in accordance with the at least one free game characteristic.

2. The gaming machine of claim 1 which displays, on the display, the number of unplayed awarded free games for enabling the player to know how many free games are available to be played.

3. The gamine machine of claim 1 in which the predefined free game winning event is an occurrence of a trigger condition in one of an underlying base game and a feature game.

4. The gaming machine of claim 1 in which, each time one or more special symbols appear on the display, each special symbol causes a counter to increment and, the predefined winning event is when the counter has reached a maximum value.

5. The gaming machine of claim 1 in which the free game selector is in the form of a switch arrangement.

6. The gaming machine of claim 1 in which the free game selector comprises a touch-sensitive zone on a screen display of the display.

7. The gaming machine of claim 1 in which the free game selector includes a free game menu selector for, when activated, displaying a free game menu on the display, the free game menu comprising free game data representing unplayed awarded free games and the free game characteristics of each unplayed awarded free game.

8. The gaming machine of claim 7 in which the free game menu selector is implemented by way of at least one of a press-button switch on the midtrim and a touch sensitive zone of a screen display of the display.

9. The gamine machine of claim 7 in which the free game data displayed on the free game menu comprises at least one free game series, each free game series comprising at least one free game characteristic and a number of free games with that at least one free game characteristic which have been awarded and are unplayed.

10. The gaming machine of claim 7 in which the game controller displays the free game menu for a predetermined period of time following which it is removed and an underlying screen is again displayed.

11. The gaming machine of claim 7 in which the free game menu is displayed as at least partially transparent so that underlying images on the display is at least partially visible through the free game menu.

12. The gaming machine of claim 7 in which when the free game menu contains a maximum number of free game series, that game controller is unable to store data relating to a further free game series and the game controller issues a warning.

13. The gamine machine of claim 12 in which when the free game menu contains a maximum number of free game series, if any further free games relating to a further free game series are awarded, the game controller causes the further awarded free games to be played automatically immediately after the trigger game and prior to further game play.

14. The gaming machine of claim 1 in which an alerter for alerting the player that there are unplayed awarded free games when a player leaving event occurs.

15. The gamine machine of claim 1 in the game controller is configured automatically to play any unplayed award free games once credit of the player has been depleted.

16. The gaming machine of claim 1 in which the free game selector is further operable by the player to select to play all unplayed awarded free games.

17. The gaming machine of claim 1 in which the gaming machine further comprises at least one data meter for metering data relating to the operation of the gaming machine and any free game played which results in a win is associated by the at least one data meter with a last played rather than with the game in which the free game was awarded.

18. The gaming machine of claim 1, in which:

the symbols are associated with a plurality of paylines on each of which the player places one of a plurality of wager amounts; and the at least one free game characteristic comprises the paylines which are active and the wager amounts associated with each active payline.

19. The gaming machine of claim 18, in which the wager configuration of the trigger game comprises the paylines which are active and the wager amounts associated with each active payline in the trigger game.

20. The gaming machine of claim 14, in which the player leaving event comprises the player activating a collect button on the gaming machine.

21. A gaming machine having a display and a game controller adapted to control images of symbols displayed on the display, the game controller being adapted to allow a player to play a game for a wager, the game involving a random display of symbols on the display, and if a preselected winning display of symbols occurs on the display, the game controller awards a prize, the game controller being adapted to accept different wager configurations for each play of the game, the quantum of the prize awarded and/or the probability of the prize being awarded being related to the wager configuration under which the game in which the prize is awarded was played, the gaming machine being characterised in that:

the game controller is adapted to award a prize of one or more free games to the player when one or more preselected outcomes occur during the play of the game on the machine, the game controller being adapted to monitor and store data relating to at least one characteristic of the free game or games awarded, the characteristic relating to the configuration of the wager of the game in which the free game was awarded, and the gaming machine includes a free game selector operable by the player to enable the player to select when an awarded free game is to be played, the game controller being adapted to ensure that the free game, when played, is played in accordance with the characteristics of the wager configuration of the game in which that free game was awarded.

* * * * *